(12) United States Patent
Suenbuel (10) Patent No.: US 7,823,119 B2
(45) Date of Patent: Oct. 26, 2010

(54) CONSTRAINT BASED SOFTWARE SYSTEMS AND METHODS

(75) Inventor: Asuman Suenbuel, San Jose, CA (US)

(73) Assignee: SAP AG, Walldorf (DE)

( * ) Notice: Subject to any disclaimer, the term of this patent is extended or adjusted under 35 U.S.C. 154(b) by 1069 days.

(21) Appl. No.: 11/390,625

(22) Filed: Mar. 28, 2006

(65) Prior Publication Data

US 2007/0234280 A1  Oct. 4, 2007

(51) Int. Cl.
*G06F 9/44* (2006.01)
(52) U.S. Cl. ..................................... 717/100
(58) Field of Classification Search .................. 717/100
See application file for complete search history.

(56) References Cited

U.S. PATENT DOCUMENTS

| | | | |
|---|---|---|---|
| 4,920,499 A * | 4/1990 | Skeirik | 706/11 |
| 5,794,172 A * | 8/1998 | Matheson et al. | 701/117 |
| 7,161,489 B2 * | 1/2007 | Sullivan et al. | 340/572.4 |
| 2003/0018547 A1 * | 1/2003 | Steele | 705/29 |
| 2003/0227392 A1 * | 12/2003 | Ebert et al. | 340/825.49 |
| 2006/0097873 A1 * | 5/2006 | Vrba et al. | 340/572.1 |

* cited by examiner

*Primary Examiner*—Wei Y Zhen
*Assistant Examiner*—Lanny Ung
(74) *Attorney, Agent, or Firm*—Fountainhead Law Group PC (57) ABSTRACT

Embodiments of the present invention provide constraint based software systems and methods. In one embodiment, the present invention includes a method of controlling the operation of system software comprising generating a plurality of domain level constraints, translating the plurality of domain level constraints into system level constraints, and controlling a system using the system level constraints. System level software may respond rapidly to changing conditions through modification of domain level constraints and translation of domain level constraints into system level constraints. Pre-processing of raw data from RFID or sensors may trigger incidents that automatically trigger the modification of domain level constraints, thereby changing the system level software automatically in response to changes in the operational environment.

18 Claims, 6 Drawing Sheets

CONSTRAINT BASED SOFTWARE SYSTEMS AND METHODS

CROSS REFERENCE TO RELATED APPLICATIONS

Not applicable.

BACKGROUND

The present invention relates to computer software, and in particular, to constraint based software systems and methods.

Software plays an increasingly central and crucial role in a variety of applications. For example, software is often used to control and manage the behavior of a variety of types of systems. One particular type of system that may benefit from software control and management is a logistics system, such as a supply chain management system, for example. Systems are typically comprised of many components or subsystems. These components or subsystems may further be made up of subcomponents, which themselves may include components. Each component of a system may contribute some functionality to help the system achieve its overall goals. In order to contribute to the goals of the system, each component may be required to meet certain goals of its own. Accordingly, the goals of the system may be achieved by each component in the system working to achieve its own operational or functional goals.

For large systems, defining the goals of the system may be partially or completely disconnected from defining the goals of the system's components. For example, in a supply chain management system, defining system goals, such as maximum delivery time or maximum average inventory, may required an entirely different skill set than defining the goals of a component, such as the detailed requirements of one or more airplanes used to deliver goods. During development of the system software, different people may be needed to properly specify the different goals to be achieved. For instance, the above example illustrates the importance of having specialists (e.g., inventory control specialists or airline specialist) participate in defining the requirements of some components. Such specialists are often used to specify one or more "domains" in the system software, and they are referred to as "domain experts." An example of a domain expert would be an airline specialist who may participate in defining the goals of a component of system software dealing with airline logistics (terminal availability, airplane fueling and maintenance, air travel times, etc. . . . ).

Figure 1:
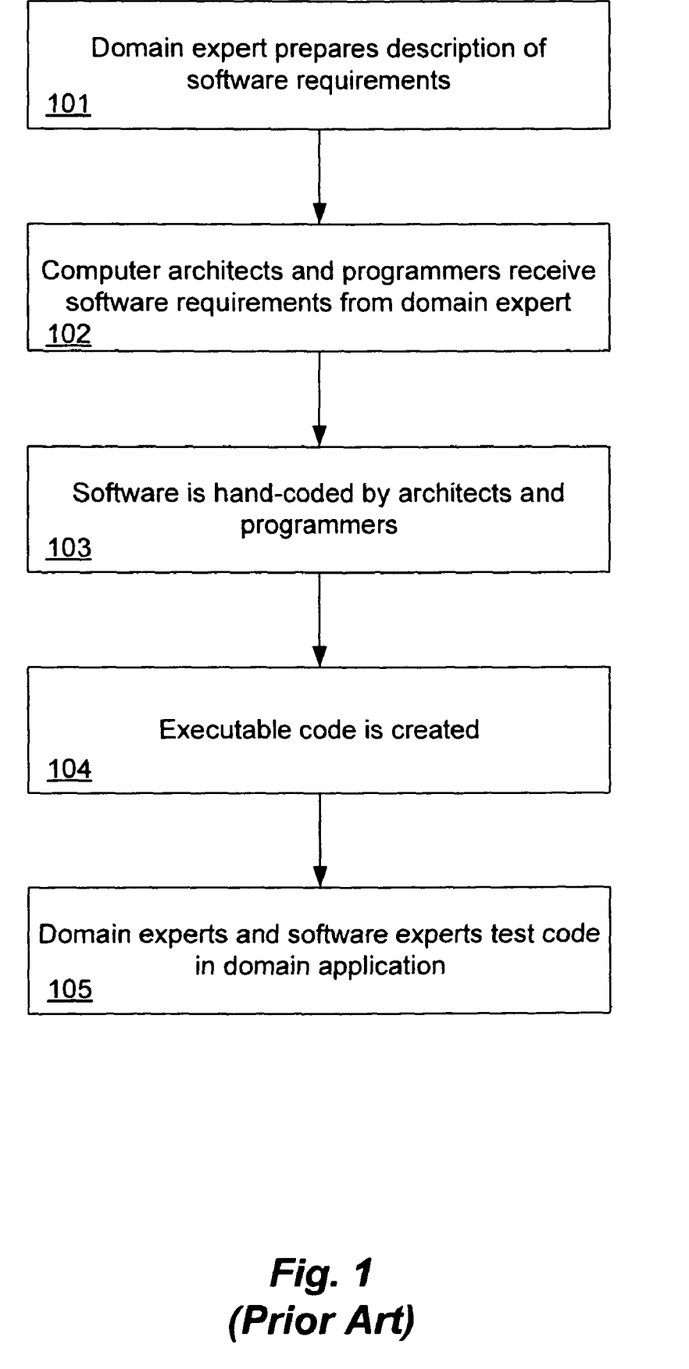
FIG. 1 illustrates a typical software development process.

FIG. 1 illustrates a typical software development process for a subsystem of a software system for a particular domain. First, at 101, a domain expert may prepare a description of the requirements for a particular domain (e.g., one or more logically related components of the system). However, domain experts are typically do not have expertise in computer programming and architecture. Thus, while domain experts may be required to define the goals of particular subsystems, computer architects and programmers are typically used to implement the system and develop the code for the software. At 102, the domain experts meet with computer software architects and programmers to provide them with the requirements of a particular domain of the software. At 103, the software is designed and hand-coded by the architects and programmers. At 104, executable software code for the various system components is created. At 105, domain experts may again be consulted to help test the code for the particular domain application.

The above example illustrates one shortcoming with existing software systems. Because of the design methodology used, potential disconnects between domain experts and software experts are inherent in the development process, which may lead to faulty behavior of one or more system components or the system as a whole. Software experts, for example, may implement domain level functions, or integrate such functions into the larger system, erroneously because they lack the expertise to identify problems not expressly defined by the experts. There is also a potential for erroneous translations between the domain expert's goals and the software expert's implementation of such goals.

Another related problem with large software systems is that such systems may have to integrate large amounts of data from a variety of different sources. Given the ever increasing supply of raw data available in computer systems, managing such data can quickly overwhelm a system. More particularly, as data is collected and processed by a system, modifications to system components or the system as a whole may be necessary to adjust to changing real world conditions. Repeating the time consuming task of redeveloping one or more system components with domain experts and computer specialists may be difficult or even unworkable. This is especially true in real world applications where changing conditions require rapid responses and solutions.

Thus, there is a need for improving the creation and operation of system software. The present invention solves these and other problems by providing constraint based software systems and methods.

SUMMARY

Embodiments of the present invention provide constraint based software systems and methods. The systems and methods described below may be performed by software on one or more computer systems or embodied in computer-readable medium containing instructions for controlling a computer system. In one embodiment, the present invention includes a method of controlling the operation of system software comprising generating a plurality of domain level constraints, translating the plurality of domain level constraints into system level constraints, and controlling a system using the system level constraints.

In one embodiment, translating the plurality of domain level constraints comprises generating code including the system level constraints.

In one embodiment, translating the plurality of domain level constraints comprises generating metadata including the system level constraints.

In one embodiment, the domain level constraints are generated in accordance with user input.

In one embodiment, the domain level constraints are generated by a software tool, and wherein the software tool provides a graphical user interface to a user, and wherein the user specifies domain level constraints using the graphical user interface.

In one embodiment, the method further comprises detecting a system incident, modifying the domain level constraints in response to the system incident, and translating the modified domain level constraints into modified system level constraints to control the system.

In one embodiment, the method further comprises receiving RFID data, and generating a system incident based on the RFID data.

In one embodiment, receiving RFID data comprises receiving raw RFID data in a plurality of RFID readers, and processing the raw RFID data in an RFID data processor using a predefined algorithm.

In one embodiment, generating a system incident based on the RFID data comprises generating a system incident based on the predefined algorithm.

In one embodiment, the predefined algorithm is a filtering algorithm.

In one embodiment, the system is a supply logistics system.

In one embodiment, the domain level constraints are represented as a domain specific language.

In another embodiment, the present invention includes a computer software system comprising a plurality of domain level constraints, a domain level constraint to system level constraint translator, a plurality of system level constraints, and system software, wherein the system software receives the system level constraints as inputs to control the system.

In one embodiment, the system further comprises a constraint solver that receives system level constraints, and in accordance therewith, controls the system.

In one embodiment, the system further comprises an incident detector.

In one embodiment, the system further comprises an RFID data processor coupled to the incident detector.

In one embodiment, the system further comprises a domain level constraint generator.

In one embodiment, the domain level constraints are represented as a domain specific language.

In one embodiment, the domain level constraint generator comprises a graphical user interface for graphically specifying domain level constraints.

In one embodiment, the system further comprises a domain level constraint modifier.

In one embodiment, the domain level constraint translator is a code generator, and wherein code generated by the code generator includes the system level constraints.

In one embodiment, the domain level constraint translator generates metadata, and the generated metadata includes the system level constraints.

The following detailed description and accompanying drawings provide a better understanding of the nature and advantages of the present invention.

DETAILED DESCRIPTION

Described herein are techniques for constraint based software systems and methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 2:
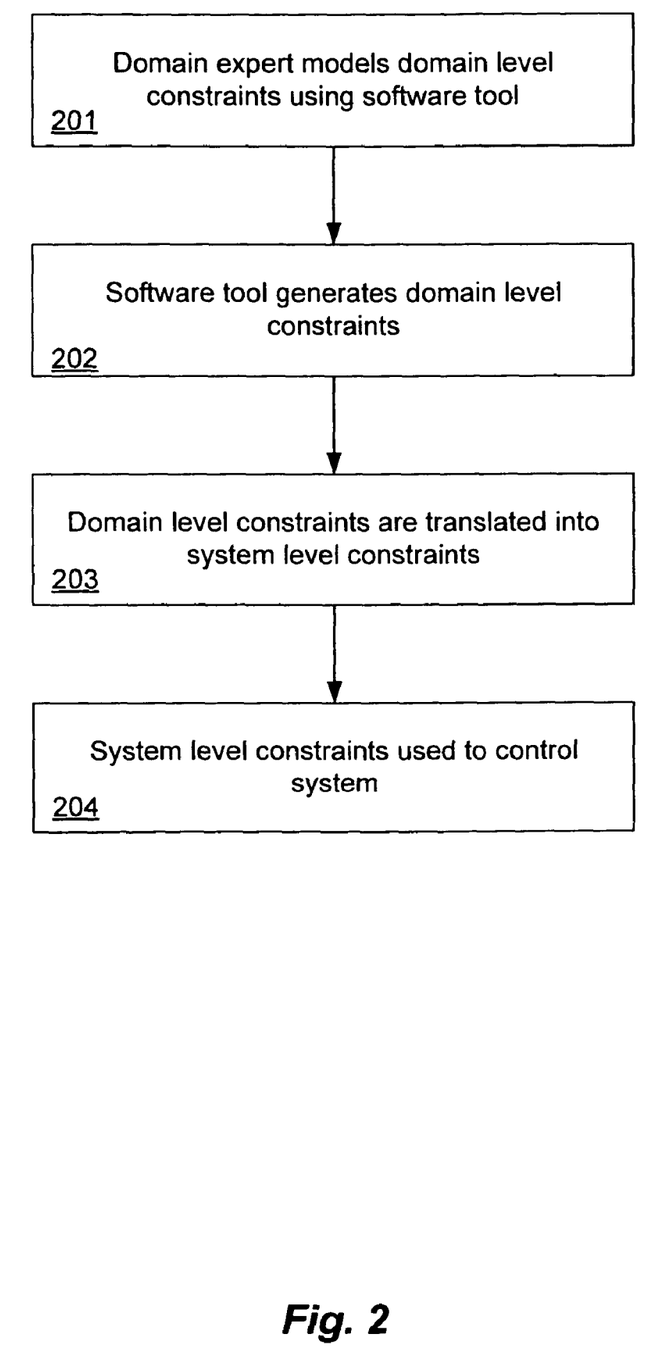
FIG. 2 illustrates one embodiment of a constraint based software method.

FIG. 2 illustrates one embodiment of a constraint based software method. In one embodiment, domain level constraints are specified and used to automatically generate system level constraints. As used herein, the term "constraints" means restrictions on a domain or system such as, for example, limits, rules, or regulations that govern the domain's or system's allowable states. Domain level constraints are software representations of these restrictions that are applicable across a particular domain of a system. The domain of a system is a logical grouping of one or more components or elements of the system. System level constraints are software representations of restrictions that are applicable to the system as a whole. Distinguished from traditional source code constructs, constraints may be represented as models that can be applied against system state information to achieve goals and control the operational behavior of software. Accordingly, embodiments of the present invention introduce model based methods and tools for the goal-oriented integration, design, and synthesis of system software. Such an approach is particularly applicable to logistics applications, for example.

As shown in FIG. 2, at 201, a domain expert models domain level constraints using a software tool. In one embodiment, a software tool may provide an intuitive user interface to a user, such as a domain expert, and the user specifies domain level constraints using the user interface. An example system may express a domain graphically to a user, for example, and generate software representations of constraints on the domain in response to the domain expert's inputs. Accordingly, a domain expert may use the interface to directly introduce, change, or delete domain level constraints, thereby reducing the time for implementing new functionality or requirements in the underlying system level software. At 202, the software tool generates domain level constraints. As mentioned above, the domain level constraints apply to components or elements within a particular domain (e.g., constraints on a single airplane). At 203, the domain level constraints are translated into system level constraints. System level constraints apply to the system as a whole (e.g., constraints on an airport). In one example embodiment described in more detail below, the system level constraints may be included in code that is automatically generated from the domain level constraints. Alternatively, the system level constraints may be included in metadata that is automatically generated from the domain level constraints and provided to the system software to configure the system. At 204, the system level constraints are used to control the system.

Figure 3:
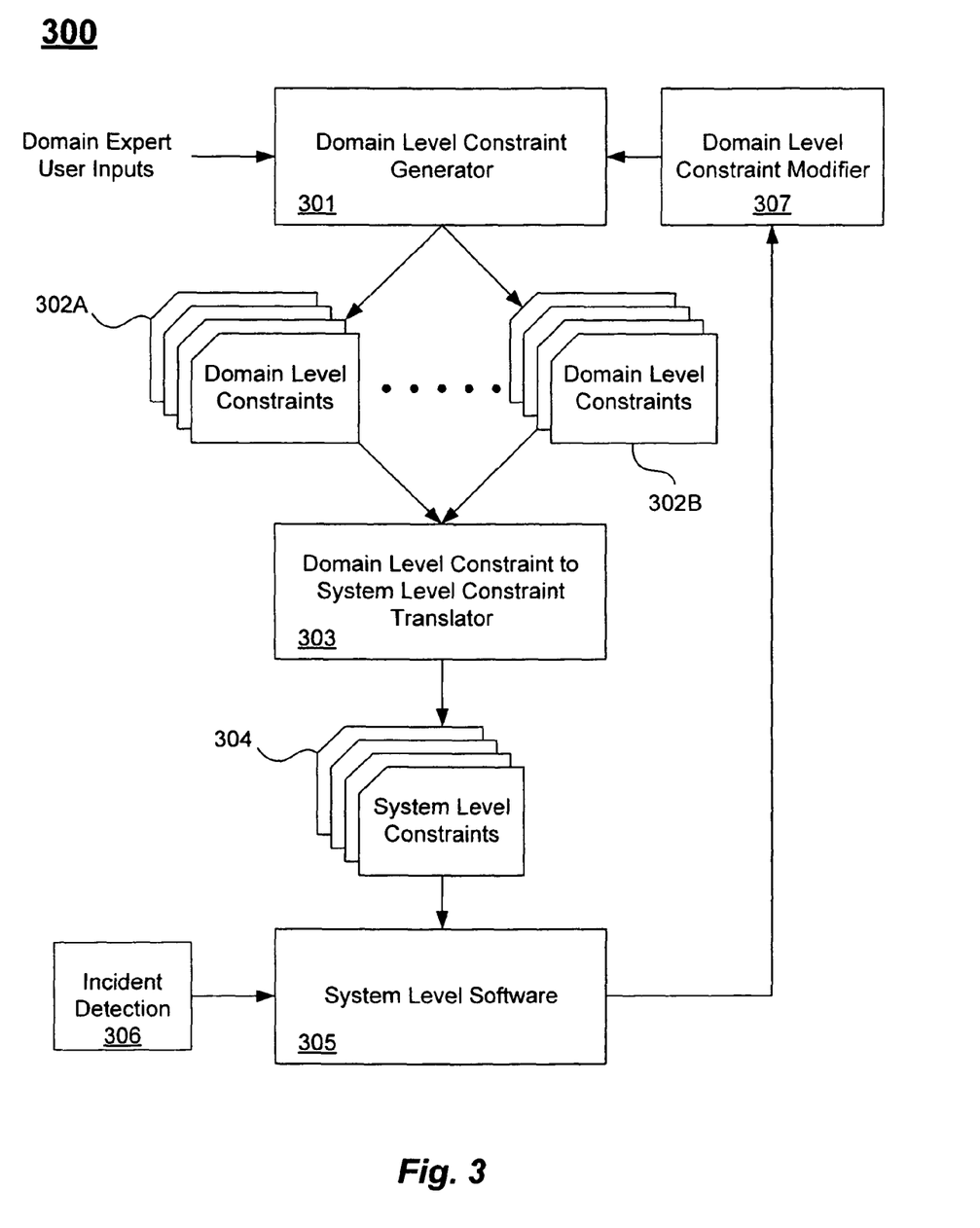
FIG. 3 illustrates one embodiment of a constraint based software system and method.

FIG. 3 illustrates one embodiment of a constraint based software system and method. Constraint based software system 300 includes a domain level constraint generator 301. Domain level constraint generator 301 is a software component that receives inputs and generates constraints for a particular domain based on the inputs. For example, domain level constraint generator 301 may include a graphical user interface. Accordingly, a domain expert may manipulate graphical objects corresponding to features of a domain in the graphical user interface. A domain expert may specify one or more constraints for a domain, and domain level constraint generator 301 may generate software representations of the domain level constraints as illustrated at 302A and 302B. As described in more detail below, domain level constraint generator may alternatively generate domain level constraints 302A-B automatically in response to incident detection. In an example implementation, domain level constraint generator 301 may generate domain level constraints represented as a domain specific language. A domain-specific language ("DSL") is a programming language tailored specifically for an application domain. Rather than being general purpose it captures precisely the domain's semantics. Examples of DSLs include lex and yac used for program lexical analysis and parsing, HTML used for document mark-up, and VHDL used for electronic hardware descriptions. Domain-specific languages allow the concise description of an application's logic reducing the semantic distance between the problem and the program.

Domain level constraints 302A-B may be received by a domain level constraint to system level constraint translator 303. Translator 303 translates domain level constraints 302A-B into system level constraints 304. In one embodiment, translator 303 may include a code generator for generating code including system level constraints. In another embodiment, translator 303 may generate metadata including system level constraints. In one example implementation, translator 303 and domain level constraint generator 301 are separate independent components. However, in another example implementation, translator 303 may be integrated together with domain level constraint generator 301 (e.g., as part of a single software tool) and domain level constraints may be stored locally in a database, for example, prior to being translated. In one particular embodiment, the domain level constraints may be transformed into records and stored in a knowledge base.

The generated code or metadata, in turn, may be used by system level software 305 to control a system. Constraint based software system 300 may also include an incident detector 306. Incident detector 306 may detect a variety of system incidents that may be used to introduce or modify domain level constraints, which may trigger changes in the system level software. For example, detected incidents in a logistics system may change resource allocations. If a supplier, for example, is unable to deliver goods because a particular delivery route is unavailable (e.g., a road is out or a particular delivery truck is broken), alternative routes and/or goods may need to be assessed. An incident detector 306 may register the unavailability of a delivery route and signal another component of the system to modify the constraints for the relevant domain (e.g., the unavailability of the route may be represented as one or more new or modified domain level constraints), which are then translated into system level constraints to reprogram the system. The system may then recompute the delivery parameters using the new system level constraints, and attempt to delivery the goods. Later, if the delivery route becomes available, the incident detector may again trigger modification of domain level constraints, which are propagated back into the system level software. Incident detector 306 is illustrated here as a separate component. However, it is to be understood that incident detection may be implemented as a component of system level software 305.

Incident detector 306 may detect the occurrence of a variety of events affecting the system including data inputs, internal system state changes, or changing requirements, for example. An incident detection signal may be generated and transmitted to system software 305. Information about an incident may be forwarded (with or without processing) to domain level constraint modifier 307. Upon receiving such information, domain level constraint modifier 307 may modify one or more domain level constraints such as constraints 302A-B. Example implementations may include integrating domain level constraint modifier 307 together with domain level constraint generator 301. Thus, modifier 307 may be a separate component or it may be a component of generator 301, for example. Modified domain level constraints 302A-B may, in turn, be translated into modified system level constraints to control the system after the incident. Accordingly, operation of system 300 may be controlled by changing domain level constraints in response to incidents, and then propagating such changes into the system level software by modifying the system level constraints, thereby allow the system level software to rapidly react to changes in the environment of the deployed system.

Figure 4:
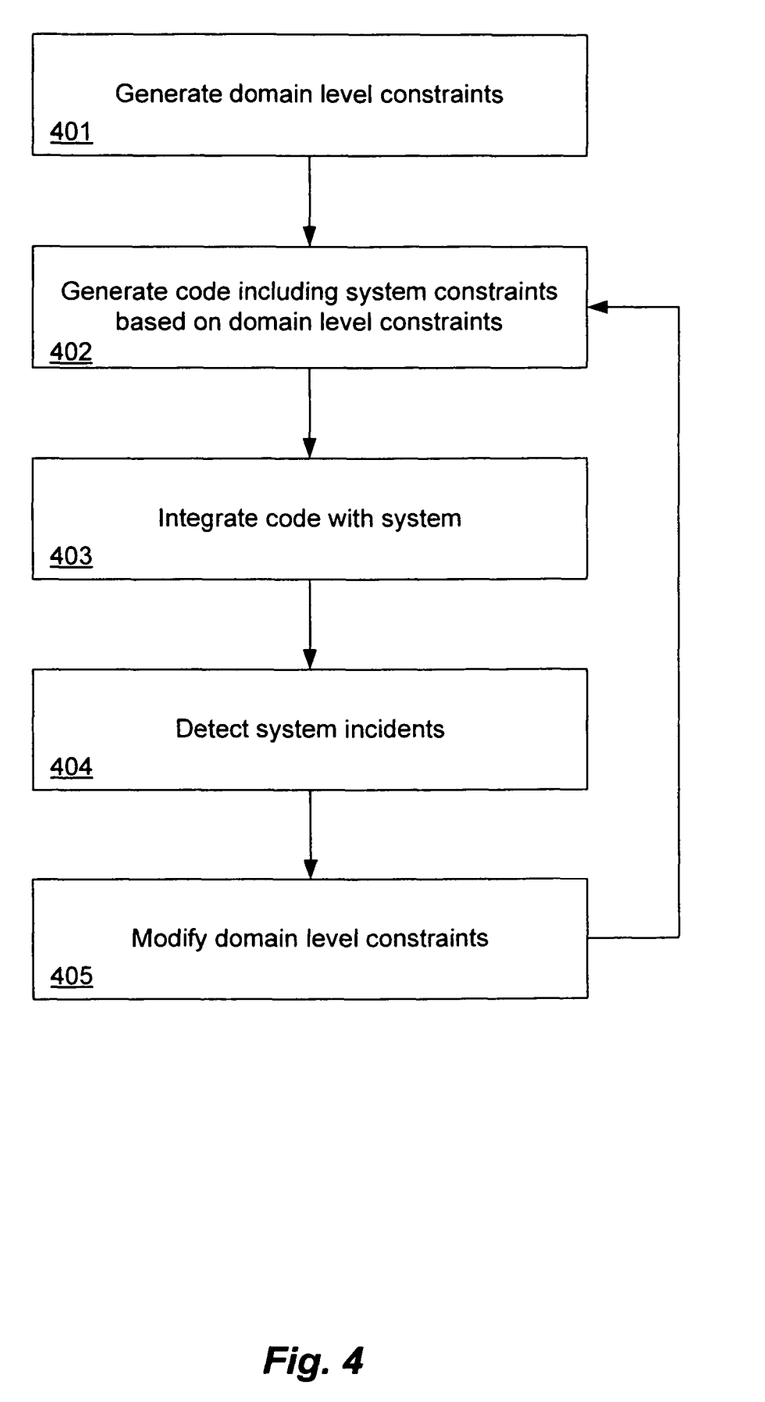
FIG. 4 illustrates another embodiment of a constraint based software method.

FIG. 4 illustrates another embodiment of a constraint based software method. At 401, domain level constraints are generated. At 402, code, which includes system level constraints, is generated based on the domain level constraints. As mentioned above, in another embodiment metadata including system level constraints may be generated based on domain level constraints. At 403, the generated code is integrated with the system. For example, code may be generated as components with predefined interfaces designed to integrate with one or more particular components of the system software. In another embodiment, the behavior of the system software may be configurable using metadata, in which case the generated metadata may be received by the system software, optionally parsed, and used to configure the system software (e.g., by configuring existing components with the metadata or by generating new functional components based on the metadata). At 404, incidents affecting the system are detected. Example incidents may be triggered by data inputs, for example. At 405, the detected incidents trigger modifications to the domain level constraints. The process may return to 402 where modified code or metadata including system level constraints may be generated for the system software.

Figure 5:
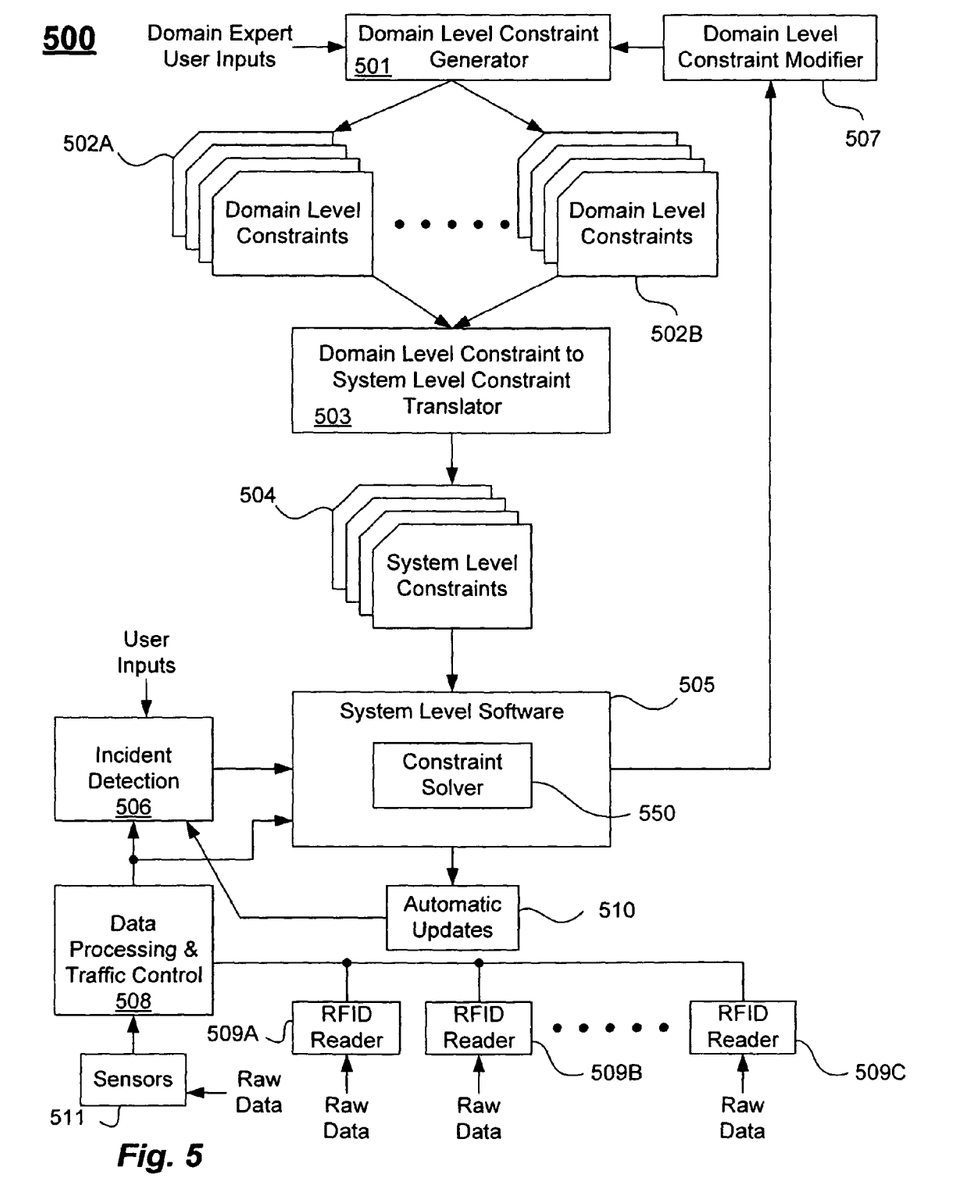
FIG. 5 illustrates another embodiment of a constraint based software system and method.

FIG. 5 illustrates another embodiment of a constraint based software system and method. System 500 includes a domain level constraint generator 501 that may receive user inputs from a domain expert, for example, or from a domain level constraint modifier 507. Generator 501 generates domain level constraints 502A-B, for example. Domain level constraints 502A-B are received by domain level constraint to system level constraint translator 503. Translator 503 may be a code generator or a metadata generator, for example, for translating the domain level constraints 502A-B into system level constraints 504. System level software 505 receives the system level constraints 504 as generated code or metadata. In this example, system level software 505 includes a constraint solver 550. Constraint solver 550 may receive the system level constraints 504 in the code or metadata and create optimized software components for implementing a given set of constraints. For example, constrain solver 550 may receive as inputs system level constraints (e.g., resource constraints such as an amount of a resource), system data, system states (e.g., system requirements or demands), and calculated parameters (e.g., risk factors involved in using a resource), and translate such inputs into real-time system controls. Example system controls in a logistics system may include, for example, generating scheduling algorithms or resource allocations based on the system constraints and other inputs.

System 500 illustrates another feature that may be included in some embodiments of a constraint based software system. System 500 includes a plurality of radio frequency identification ("RFID") readers 509A-C. RFID readers 509A-C may receive data from RFID tag devices, for example, which may provide a variety of different data inputs to the system software. Raw data is received by each reader 509A-C. The readers may receive related data (e.g., a network of RFID readers that receive tag identifications in a warehouse), or the readers may receive different data (e.g., data from a variety of different tags at different locations). System 500 may also receive raw data from a variety of sensor networks 511. While the present example is illustrated using RFID and sensor data inputs, it is to be understood that a variety of other data input components may also be included that act as an entry point of raw data into the system software such as terminals, mobile devices, embedded systems, Bluetooth enabled devices, or bar code readers to name just a few.

New tag or sensor data may result in huge amounts of low level data as a result of continuous tag and sensor readings. Such a raw data stream is not a good starting point on top of which business logic rules can be expressed in a meaningful way. It would be beneficial if business applications could start with more meaningful statement of "what, when, and where" the data was related to. Accordingly, system level software 505 may be overwhelmed with raw data. In this example, system 500 includes a data processing and traffic control component 508 to preprocess the data steams. Component 508 serves as a connector between the physical data input devices (e.g., RFID readers and sensors) and the system level software. Component 508 implements a preprocessing layer of abstraction between the raw data streams and the system software logic. Data processing and traffic control component 508 may implement a variety of predefined algorithms for processing incoming data to improve the ability of system level software 505 to use the data streams efficiently. Preprocessing the raw data streams may include monitoring data streams and forwarding data only to system level software components that need it, filtering the data, aggregating the data, mapping raw data elements to system level software inputs or events, or performing other logic on the data as appropriate for a particular application or data input configuration, such as a particular RFID or sensor network configuration. System level software may be coupled to a plurality of such preprocessors 508. In one embodiment, preprocessor 508 may include a network of computers (e.g., servers) executing distributed preprocessing software for receiving and analyzing incoming raw data steams. Preprocessor 508 may be coupled to a variety of components of system level software 505.

The preprocessing in data processing component 508 generates results that are provided as inputs to incident detection component 506 so that the system level software can monitor data streams and generate and adapt to changing system conditions in real time. Incident detection component 506 may receive data inputs from preprocessor 508 or user inputs, for example. Incident detector 506 may also receive inputs from system level software 505, such as automatic updates 510 of state information or parameter values, for example. In one example implementation, incident detection component 506 may use a state model of the system and partition the state space into legal and illegal states. Certain events can cause the system to go into illegal states, which may be interpreted as an incident, for example. The system may react to incidents by reconfiguring the system (e.g., resources and schedules in a logistics application) using self-stabilization algorithms that attempt to repair the system and recover from an incident. Additionally, incidents detected in the data streams (e.g., as the result of algorithms applied against the raw data inputs during preprocessing) may be coupled through system level software 505 to domain level constraint modifier 507. In one embodiment, incidents may be described in a domain-specific, constraint based representation that succinctly describes incidents including events, current states, global system software views, capabilities, or negotiation strategies for responding to an incident, for example. Accordingly, domain level constraint modifier 507 may receive information pertaining to a constraint and translate such information into the above mentioned domain level constraint representation as part of the modification process. The above description illustrates that one implementation of the techniques described herein allows raw data inputs to be used, in part, to dynamically change the system level software to adapt to new demands originating from changes in the environment of the deployed system or from new requirements to the overall functionality of the system level software.

Figure 6:
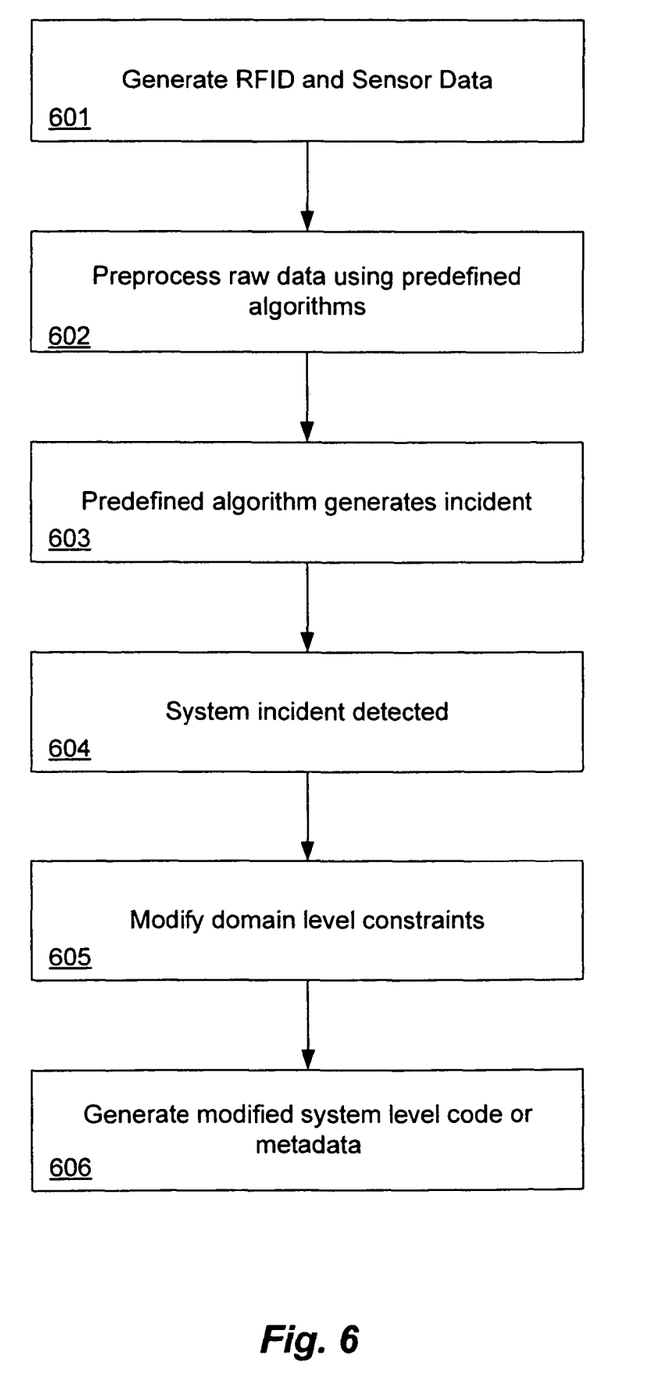
FIG. 6 illustrates another embodiment of a constraint based software method.

FIG. 6 illustrates another embodiment of a constraint based software method. At 601, raw data such as RFID data or sensor data is generated. At 602, the raw data is preprocessed using predefined algorithms. As mentioned above, the predefined algorithms may vary from application to application, but examples include filtering, aggregating, or mapping particular data elements to system level software functions. The algorithms may be used to generate an incident at 603. At 604, the incident is detected by the system level software. At 605, the incident triggers modification of domain level constraints. In some embodiments, an incident may be coupled directly to a software tool including a domain level constraint generator or modifier for modifying existing domain level constraints or adding new domain level constraints. At 606, modified system level constraints are generated and included in code or metadata. The system level constraints may then be used to reconfigure the system level software according to changing conditions represented by the incoming raw data.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of controlling the operation of a Radio Frequency Identification (RFID) system comprising:

on at least one computer, performing the following steps:
receiving, from a first user, a plurality of domain level RFID system constraints, wherein the domain level RFID system constraints are applicable across one or more components of the RFID system;
translating the plurality of domain level RFID system constraints into RFID system level constraints, wherein the RFID system level constraints are applicable across the RFID system as a whole; and
controlling the RFID system using the RFID system level constraints;
receiving RFID data and generating an RFID system incident in response to the RFID data;
receiving, at a system level, the RFID system incident;
forwarding, at the system level, the RFID system incident to a domain level;
modifying the domain level RFID system constraints in response to the RFID system incident; and
translating the modified domain level RFID system constraints into modified RFID system level constraints to control the RFID system.

2. The method of claim 1 wherein translating the plurality of domain level RFID system constraints comprises generating code including the RFID system level constraints.

3. The method of claim 1 wherein translating the plurality of domain level RFID system constraints comprises generating metadata including the RFID system level constraints.

4. The method of claim 1 wherein the domain level RFID system constraints are generated by a software tool, and wherein the software tool provides a graphical user interface to a user, and wherein the user specifies domain level RFID system constraints using the graphical user interface.

5. The method of claim 1 wherein the system is a supply logistics system.

6. The method of claim 1 wherein the domain level RFID system constraints are represented as a domain specific language.

7. A Radio Frequency Identification (RFID) system comprising:
- one or more computers;
- a domain level constraint generator software component, operable on said one or more computers, to receive, from a first user, a plurality of domain level RFID system constraints, wherein the domain level RFID system constraints are applicable across one or more components of the RFID system;
- a translator software component, operable on said one or more computers, to translate the plurality of domain level RFID system constraints into RFID system level constraints, wherein the RFID system level constraints are applicable across the RFID system as a whole; and
- system level software, operable on said one or more computers, to control the RFID system using the RFID system level constraints, the system level software receiving an RFID system incident generated in response to RFID data and forwarding the RFID system incident to the domain level constraint generator software component,
- wherein the domain level constraint generator software component modifies the domain level RFID system constraints in response to the RFID system incident,
- and wherein the domain level constraint generator software component translates the modified domain level RFID system constraints into modified RFID system level constraints to control the system level software.

8. The system of claim 7 wherein translating the plurality of domain level RFID system constraints comprises generating code including the RFID system level constraints.

9. The system of claim 7 wherein translating the plurality of domain level RFID system constraints comprises generating metadata including the RFID system level constraints.

10. The system of claim 7 wherein the domain level RFID system constraints are generated by a software tool, and wherein the software tool provides a graphical user interface to a user, and wherein the user specifies domain level RFID system constraints using the graphical user interface.

11. The system of claim 7 wherein the system is a supply logistics system.

12. The system of claim 7 wherein the domain level RFID system constraints are represented as a domain specific language.

13. A non-transitory computer-readable medium containing instructions for controlling a computer system to perform a method, the method comprising:
- receiving, from a first user, a plurality of domain level Radio Frequency Identification (RFID) system constraints, wherein the domain level RFID system constraints are applicable across one or more components of the RFID system;
- translating the plurality of domain level RFID system constraints into RFID system level constraints, wherein the RFID system level constraints are applicable across the RFID system as a whole; and
- controlling the RFID system using the RFID system level constraints; receiving RFID data and generating an RFID system incident in response to the RFID data;
- receiving, at a system level, the RFID system incident; forwarding, at the system level, the RFID system incident to a domain level;
- modifying the domain level RFID system constraints in response to the RFID system incident; and
- translating the modified domain level RFID system constraints into modified RFID system level constraints to control the RFID system.

14. The computer-readable medium of claim 13 wherein translating the plurality of domain level RFID system constraints comprises generating code including the RFID system level constraints.

15. The computer-readable medium of claim 13 wherein translating the plurality of domain level RFID system constraints comprises generating metadata including the RFID system level constraints.

16. The computer-readable medium of claim 13 wherein the domain level RFID system constraints are generated by a software tool, and wherein the software tool provides a graphical user interface to a user, and wherein the user specifies domain level RFID system constraints using the graphical user interface.

17. The computer-readable medium of claim 13 wherein the system is a supply logistics system.

18. The computer-readable medium of claim 13 wherein the domain level RFID system constraints are represented as a domain specific language.

* * * * *